US012290708B2

(12) United States Patent
Van Hoek-Patterson et al.

(10) Patent No.: US 12,290,708 B2
(45) **Date of Patent: *May 6, 2025**

(54) POLE SHIELD

(71) Applicant: RS Technologies Inc., Calgary (CA)

(72) Inventors: Shawn Van Hoek-Patterson, Calgary (CA); Mingzong Zhang, Calgary (CA); Howard Elliott, Jackson, MS (US); Mark Forget, Belle River (CA)

(73) Assignee: RS Technologies Inc., Calgary (CA)

( * ) Notice: Subject to any disclaimer, the term of this patent is extended or adjusted under 35 U.S.C. 154(b) by 509 days.

This patent is subject to a terminal disclaimer.

(21) Appl. No.: 17/461,968

(22) Filed: Aug. 30, 2021

(65) Prior Publication Data

US 2022/0162823 A1 May 26, 2022

Related U.S. Application Data

(63) Continuation of application No. 16/751,342, filed on Jan. 24, 2020, now Pat. No. 11,105,060, which is a (Continued)

(51) Int. Cl.
*E02D 5/60* (2006.01)
*A62C 2/06* (2006.01)
(Continued)

(52) U.S. Cl.
CPC .................. *A62C 2/06* (2013.01); *A62C 3/02* (2013.01); *E02D 5/60* (2013.01); *E02D 5/64* (2013.01);
(Continued)

(58) Field of Classification Search
CPC .... A62C 2/06; A62C 3/02; E02D 5/60; E02D 5/64; E02D 27/42; E04B 1/665;
(Continued)

(56) References Cited

U.S. PATENT DOCUMENTS 1,521,285 A 12/1924 Erickson
4,131,703 A 12/1978 Voet
(Continued)

FOREIGN PATENT DOCUMENTS

WO WO 2006/081679 8/2006
WO WO 2006/081685 8/2006
(Continued)

OTHER PUBLICATIONS

The AlphaGen A-1 Fire Wrap; AlphaGen Materials Technology Inc.; Website: www.slideserve.com; Jul. 16, 2014; pp. 1-12.
(Continued)

*Primary Examiner* — Robert Canfield
(74) *Attorney, Agent, or Firm* — Stites & Harbison PLLC; Richard S. Myers, Jr.

(57) ABSTRACT

The present disclosure relates to a pole shield for extending around a pole structure. The pole shield comprises one or more than one sheet of composite material forming a hollow structure having an open first end and an opposed open second end. The sheet or sheets of composite material comprise from about 50% to about 80% by weight of a reinforcement impregnated with about 20% to about 50% of a polyurethane resin composition comprising a combination of a polyol component and a polyisocyanate component. Two or more pole shields may be stacked one on top of the other to form a pole shield structure which extends the height of protection of the pole structure. The pole shield can be used for protecting a pole structure from damage, such as from fire, rain, wind, sand, ice, pests, moisture or electrical. The pole shield may also be used to provide structural support to a pole structure.

23 Claims, 13 Drawing Sheets

Related U.S. Application Data continuation-in-part of application No. 15/316,055, filed as application No. PCT/CA2015/050497 on May 29, 2015, now Pat. No. 10,544,601.

(60) Provisional application No. 62/006,613, filed on Jun. 2, 2014.

(51) Int. Cl.

| | |
|---|---|
| ***A62C 3/02*** | (2006.01) |
| ***E02D 5/64*** | (2006.01) |
| ***E02D 27/42*** | (2006.01) |
| ***E04B 1/66*** | (2006.01) |
| ***E04B 1/72*** | (2006.01) |
| ***E04B 1/94*** | (2006.01) |
| ***E04H 12/04*** | (2006.01) |
| ***E04H 12/22*** | (2006.01) |

(52) U.S. Cl.

CPC .............. *E02D 27/42* (2013.01); *E04B 1/665* (2013.01); *E04B 1/72* (2013.01); *E04B 1/94* (2013.01); *E04B 1/943* (2013.01); *E04B 1/944* (2013.01); *E04H 12/04* (2013.01); *E04H 12/2292* (2013.01)

(58) Field of Classification Search

CPC ... E04B 1/72; E04B 1/94; E04B 1/943; E04B 1/944; E04H 12/04; E04H 12/2292

USPC ...................................................... 52/DIG. 12

See application file for complete search history.

(56) References Cited

U.S. PATENT DOCUMENTS

| | | | | |
|---|---|---|---|---|
| 4,822,659 | A | 4/1989 | Anderson et al. | |
| 5,083,408 | A | 1/1992 | Blom et al. | |
| 5,232,976 | A | 8/1993 | Horacek et al. | |
| 5,311,713 | A | 5/1994 | Goodrich et al. | |
| 5,423,150 | A | 6/1995 | Hitchcock et al. | |
| 5,746,031 | A | 5/1998 | Burns et al. | |
| 6,016,889 | A | 1/2000 | Pearcy et al. | |
| 6,074,714 | A | 6/2000 | Gottfried et al. | |
| 6,420,493 | B1 | 7/2002 | Ryckis-Kite et al. | |
| 6,500,555 | B1 | 12/2002 | Khaldi et al. | |
| 6,706,793 | B2 | 3/2004 | Abu-Isa et al. | |
| 6,742,305 | B2 | 6/2004 | Rogers et al. | |
| 7,395,869 | B2 | 7/2008 | Schnabel et al. | |
| 7,479,513 | B2 | 1/2009 | Reinheimer et al. | |
| 7,568,528 | B1 | 8/2009 | Miller et al. | |
| 7,686,094 | B2 | 3/2010 | Kleff et al. | |
| 8,151,898 | B2 | 4/2012 | Merchant et al. | |
| 9,376,782 | B1 * | 6/2016 | Ehsani | E02D 5/00 |
| 2001/0040166 | A1 | 11/2001 | Pietrantoni et al. | |
| 2002/0095905 | A1 | 7/2002 | Fawley et al. | |
| 2004/0074199 | A1 | 4/2004 | Gordin et al. | |
| 2006/0088386 | A1 | 4/2006 | Ellis et al. | |
| 2007/0248805 | A1 | 10/2007 | Orologio et al. | |
| 2010/0270040 | A1 * | 10/2010 | Merchant | A62C 3/02 169/48 |
| 2016/0177589 | A1 * | 6/2016 | Ceko | E04B 1/62 52/309.14 |
| 2016/0237632 | A1 * | 8/2016 | Mitchell | E04B 1/642 |
| 2021/0025188 | A1 * | 1/2021 | Rooney | E02F 3/8816 |
| 2022/0074221 | A1 * | 3/2022 | Laimbeer | E04H 17/06 |

FOREIGN PATENT DOCUMENTS

| | | | | |
|---|---|---|---|---|
| WO | WO-2010124052 A1 | * 10/2010 | | A62C 3/02 |
| WO | WO-2015184538 A1 | * 12/2015 | | A62C 2/06 |

OTHER PUBLICATIONS

Duropole Fire Proof; Brochure; www.duropole.com; 2015; pp. 1-4.

Osmose Fire Guard Wood Pole Protection; www.osmose.com; 2015; pp. 1-2.

Osmose Fire-Guard, Fire Protective Coating for Wood Utility Poles; www.osmose.com; 2015; pp. 1-2.

* cited by examiner

POLE SHIELD

This application is a continuation of U.S. Pat. No. 11,105,060, filed Dec. 2, 2016 which is a § 371 National State Application of PCT/CA2015/050497 filed May 29, 2015, which claims priority to U.S. Patent Application No. 62/006,613 filed Jun. 2, 2014.

TECHNICAL FIELD

The present disclosure is directed at a pole shield for installation around a pole structure, such as highway luminaire supports and utility poles for telephone, cable and electricity.

BACKGROUND

Pole structures are used for a variety of purposes, such as, but not limited to, highway luminaire supports and utility poles for telephone, cable and electricity. These pole structures are typically made from materials such as wood, steel or concrete.

Generally with wooden pole structures, the wood is treated to protect the pole structure from insect damage, pest attacks (such as woodpeckers and ants) and any rotting effects from moisture, which can be expensive and time-consuming. Such treatments may also make the pole structure more susceptible to fire, as they generally involve some form of petrochemical, which is impregnated into the wood of the pole structure. Other types of pole structures, such as steel and concrete pole structures may be susceptible to environmental damage, such as fire. Older pole structures made of any material may require extra structural support. Further, with some electrical steel poles, electrical insulating material may need to be provided at the point where the steel pole exists the ground in order to protect people touching the pole structure in the event of a ground fault. If these types of pole structures are damaged and are no longer functional, this can cause a service interruption to consumers, such as to those consumers travelling on highways and those who rely on these pole structures for providing telephone, cable and electricity services. It can be expensive and time consuming to replace such pole structures.

High intensity wild fires are fast-moving flame fronts that can damage or destroy utility structures, even when the exposure time is relatively short. Wood utility poles are particularly susceptible to wild fire damage from both large and small fires but other types of pole structures may also suffer damage after exposure to wild fires. While the number of wild fire events over the last 30 years seems to be relatively constant, the size of the fires appears to be increasing with time. Wild fires have devastating effects in many countries, such as the United States, Canada and Australia.

SUMMARY

According to a first aspect, there is provided a pole shield comprising a sheet of composite material forming a hollow structure having an open first end and an opposed open second end for circumferentially extending around a pole structure. The sheet of composite material comprises from about 50% to about 80% by weight of a reinforcement impregnated with about 20% to about 50% of a polyurethane resin composition comprising a combination of a polyol component and a polyisocyanate component.

According to another aspect, there is provided a pole shield comprising one or more than one sheet of composite material forming a hollow structure having an open first end and an opposed open second end for circumferentially fitting around a pole structure, the one or more than one sheet of composite material comprising from about 50% to about 80% by weight of a reinforcement impregnated with about 20% to about 50% of a polyurethane resin composition comprising a combination of a polyol component and a polyisocyanate component, wherein the pole shield has fire resistant properties.

The reinforcement may be glass. The polyol component may comprise a plurality of OH groups that are reactive towards the polyisocyanate component and the polyisocyanate component may comprise a plurality of NCO groups that are reactive towards the polyol component. The OH:NCO mixing ratio, by volume, of the polyurethane resin composition may be from about 1.0:5.0 to about 5.0:1.0. The polyol component may comprise a polyether polyol, a polyester polyol, or a mixture thereof. The polyisocyanate component may comprise an aromatic isocyanate, an aliphatic isocyanate, or a mixture thereof.

The sheet or sheets of composite material may be from about 0.2 mm to about 20.0 mm thick. The sheet or sheets of composite material may comprise a plurality of layers. The sheet or sheets of composite material may comprise between 2 and 12 layers. The sheet or sheets of composite material may include an opening extending from the first end to the second end and the sheet or sheets of composite material may be movable between a receiving position where the opening is expanded to receive the pole structure and a closed position where the opening is reduced and the sheet or sheets of composite material circumferentially extends around the pole structure. The sheet or sheets of composite material may be biased in the closed position. In the closed position a portion of the sheet or sheets of composite material may overlay another portion of the sheet or sheets of composite material.

The hollow structure may be a cylindrical tube and the cross-sectional areas of the open first end and the open second end are substantially the same. The hollow structure may be a tapered tube and the cross-sectional area of the open first end may be less than a cross-sectional area of the open second end.

According to another aspect, there is provided a pole shield structure comprising two or more pole shields according to the first aspect stacked one on top of the other with the open first end of a first of the pole shields connecting to the open second end of a second of the pole shields to increase the height of the pole shield extending around the pole structure.

The open first end of the first pole shield may overlap with the open second end of the second pole shield. The open first end of the first pole shield may be received within the open second end of the second pole shield. The open second end of the second pole shield may be received within the open first end of the first pole shield. The open first end of the first pole shield may be connected to the open second end of the second pole shield by a fastener.

The first pole shield may have a greater internal dimension than an external dimension of the second pole shield such that at least a portion of the second pole shield nests within the first pole shield when the pole shield structure is unassembled.

According to another aspect, there is provided a kit for constructing a pole shield structure comprising two or more pole shields according to the first aspect.

A first of the pole shields may have a greater internal dimension than an external dimension of a second of the pole shields, such that at least a portion of the second pole shield nests within the first pole shield.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

These and other features will become apparent from the following description in which reference is made to the appended drawings, the drawings are for the purpose of illustration only and are not intended to in any way limit the scope to the particular embodiment or embodiments shown, wherein:

FIG. 7A shows half of the pole shield embedded in the ground and half of the pole shield extending above ground; FIG. 7B shows the pole shield partially embedded in the ground with the remaining portion of the pole shield extending above ground; and FIG. 7C shows the pole shield positioned above ground only from the point where the pole structure exits the ground.

FIG. 8A shows two of the tapered pole shields of FIG. 2 stacked one on top of the other to extend the pole shield structure to a selected height around the pole structure; and where FIG. 8B shows three of the tapered pole shields of FIG. 2 stacked one on top of the other to extend the pole shield structure to a selected height around the pole structure.

In FIG. 16A the two sheets of composite material are separated and in FIG. 16B the two sheets of composite material are joined to form the pole shield.

DETAILED DESCRIPTION

Directional terms such as "top," "bottom" and "vertical" are used in the following description for the purpose of providing relative reference only, and are not intended to suggest any limitations on how any article is to be positioned during use, or to be mounted in an assembly or relative to an environment.

The present disclosure relates to a pole shield for installation around a pole structure, such as highway luminaire supports and utility poles for telephone, cable and electricity. In particular the present disclosure relates to a pole shield for installation around a utility pole. The pole shield is designed to protect the pole structure from damage, such as insect damage, pest attack, the rotting effects from moisture, UV damage and to provide structural support and fire resistance.

Figure 1:
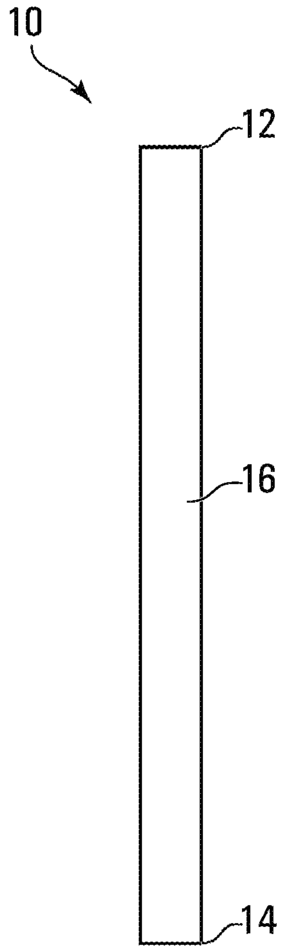
FIG. 1 is a side elevation view of a cylindrical pole shield in accordance with embodiments of the present invention.
Figure 2:
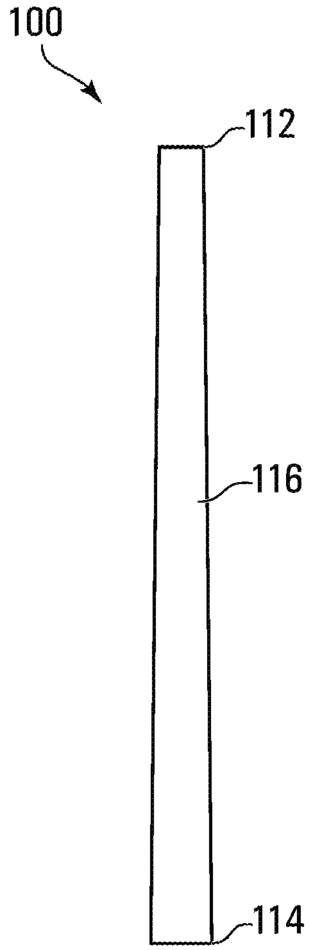
FIG. 2 is a side elevation view of a tapered pole shield in accordance with embodiments of the present invention.

Referring now to FIGS. 1 and 2, there is shown a pole shield 10, 100, for installation around a pole structure. Pole shield 10 of FIG. 1 is cylindrically shaped and pole shield 100 of FIG. 2 is tapered. Both pole shield 10 and pole shield 100 comprise a sheet of composite material (16 and 116 respectively) having a top (or first) end (12 and 112, respectively) and an opposed bottom (or second) end (14 and 114, respectively). The sheet of composite material 16, 116 forms a hollow tubular structure with open top end 12, 112 and open bottom end 14, 114. With the tapered pole shield 100, the top end 112 has a diameter less than the bottom end 114 to provide pole shield 100 with its tapered shape. With cylindrical pole shield 10, the diameter of the top end 12 is the same as the diameter of the bottom end 14. In alternative embodiments, the sheet of composite material may form a different shape, for example, but not limited to, oval, polygonal, or other shapes with a non-circular cross-section, such as, without limitation, square, triangular or rectangular or any other shape that forms a hollow structure which can be installed around a pole structure.

Figure 3:
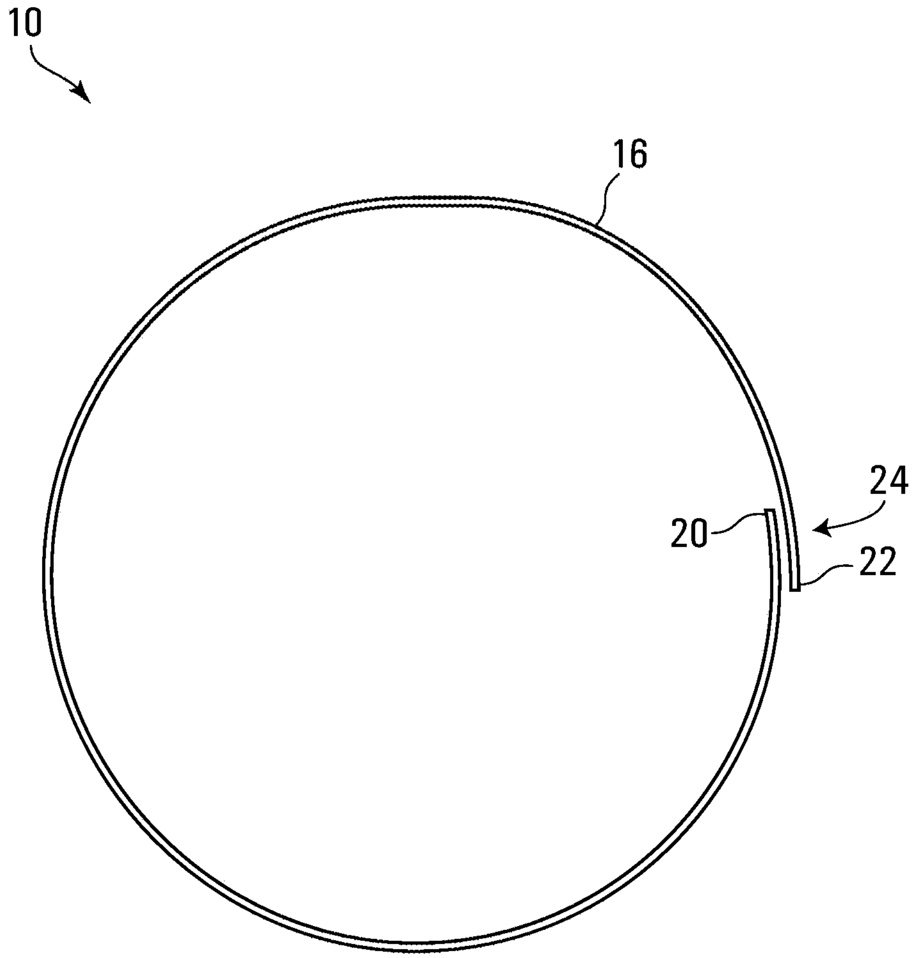
FIG. 3 is a top plan view of an embodiment of a pole shield with an opening extending longitudinally from the top end to the bottom end of the pole shield and an overlapping portion.

In an embodiment of the pole shield 10 shown in FIG. 3, the sheet of composite material 16 includes a slit or opening which extends longitudinally from the top end 12 to the bottom end 14. The sheet of composite material 16 is sufficiently flexible that the opening can be expanded to enable the pole shield 10 to be installed around a pole structure that is already mounted in or on the ground. The sheet of composite material 16 is then closed by reducing the opening. The sheet of composite material 16 has a first portion 20 and second portion 22 which overlap, forming an overlapping portion 24 of the sheet of composite material. As would be understood by those skilled in the art, overlapping portion 24 helps to ensure that pole shield 10 completely extends around a particular pole structure and also provides an area where the overlapping composite material can be secured together to form a hollow tubular structure or other hollow-shaped structure. Overlapping portion 24 allows for size variation in a pole structure due to swelling and contracting of the pole structure, as may happen with wooden pole structures. The overlapping portion 24 further allows the pole shield 10 to be used on a variety of pole structures with different outer circumferences as the internal dimensions of the pole shield can be expanded or contracted as required. In the embodiment shown in FIG. 3, the sheet of composite material 16 is biased to a tubular shape so that it returns to this tubular shape after being opened and positioned around a tubular pole structure. One of skill in the art, however, will appreciate that the composite material is of suitable flexibility that the sheet of composite material may be manipulated to conform to any appropriate shape to envelope pole structures of differing outer shapes and sizes.

Figure 4:
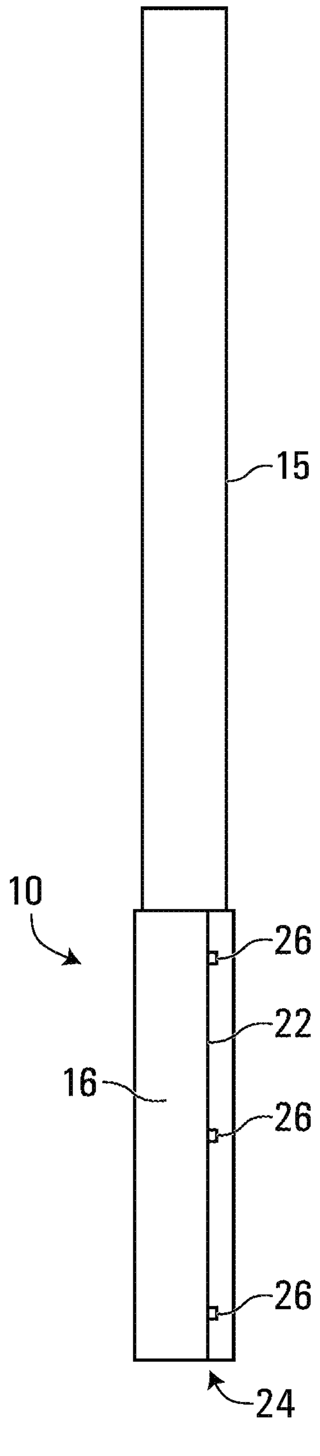
FIG. 4 is a side elevation view of the pole shield of FIG. 3 where the pole shield is installed around a pole structure using screws.
Figure 5:
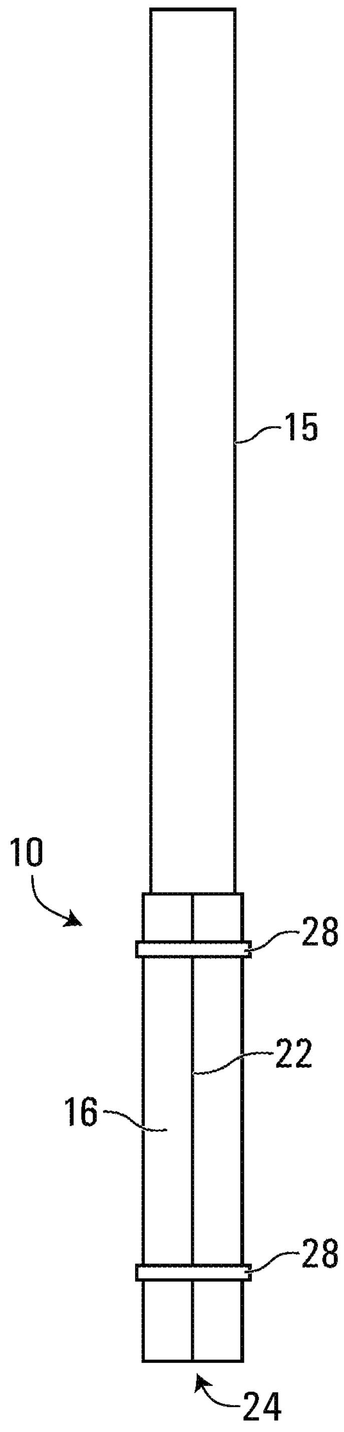
FIG. 5 is a side elevation view of the pole shield of FIG. 3, where the pole shield is installed around a pole structure using bands.
Figure 6:
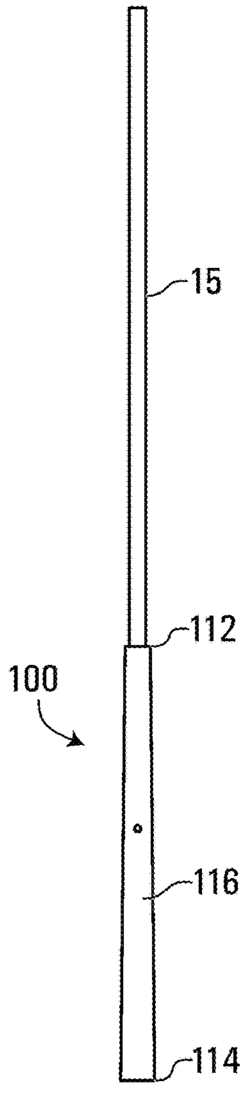
FIG. 6 is a side elevation view the pole shield of FIG. 2, where the tapered pole shield is installed around a pole structure.

Referring now to FIGS. 4 and 5, there is shown cylindrical pole shield 10 circumferentially extending around a cylindrical pole structure 15. In FIG. 6, there is shown tapered pole shield 100 circumferentially extending around the outer surface of a tapered pole structure 15. In the embodiment shown in FIG. 4, screws 26 are used to secure the overlapping portion 24 of the sheet together to secure the pole shield in position around the pole structure 15. In the embodiment shown in FIG. 5, bands 28 secure pole shield 10 in position around pole structure 15. Any other suitable fastener may be used to secure the pole shield 10 in position around pole structure 15, such as, for example, without limitation, screws, snaps, pins, nails, bolts, adhesives, bands, combinations thereof.

Figure 14:
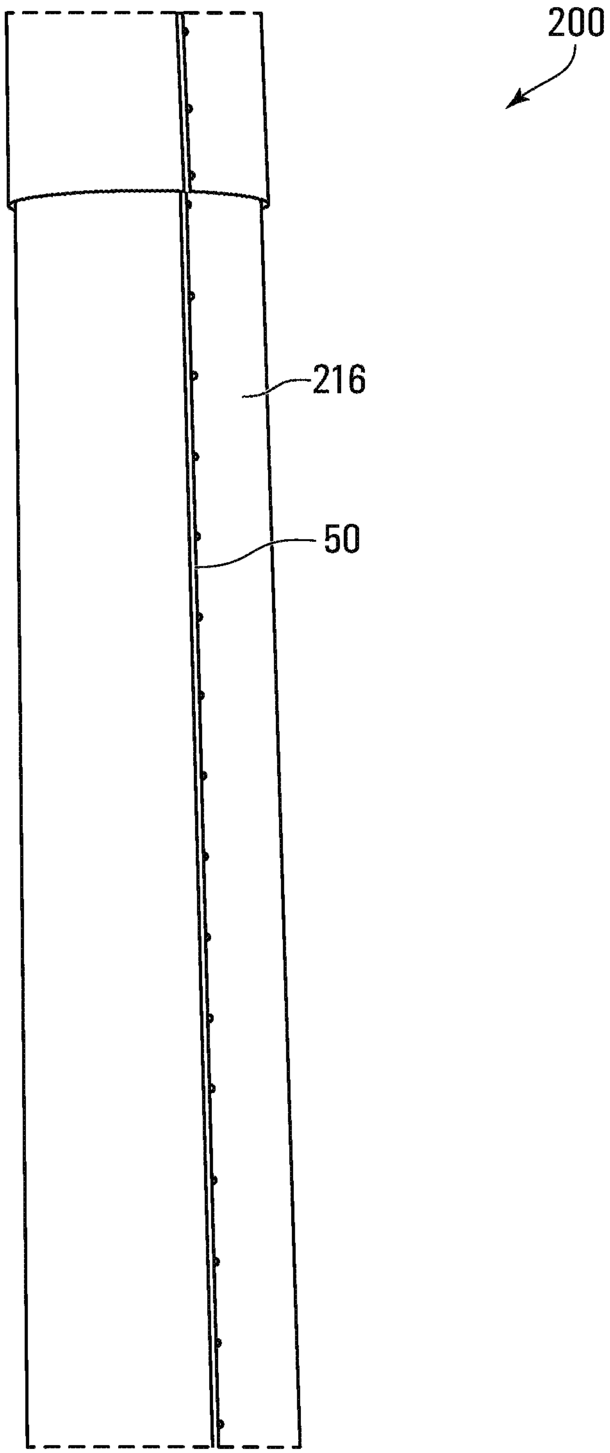
FIG. 14 is a photograph of an embodiment of a pole shield with a longitudinal slit or opening and a metal channel positioned in the slit or opening.

In an embodiment of a pole shield 200 shown in FIG. 14 a metal channel 50 is fixed in positioned in the slit or opening in the sheet of composite material 216 to seal the opening. The sheet of composite material 216 may have an overlapping portion as described above with the metal channel 50 positioned in the gap between the overlapping portions of composite material. Alternatively both longitudinal edges of the slit or opening may abut the metal channel 50 with no overlapping portions of composite material. The metal channel 50 may beneficially reduce or prevent the exposed edge of the sheet of composite material being distorted when the pole shield is subjected to fire. The metal channel 50 may be fitted to seal the opening before the pole shield is installed around a pole structure. The pole shield can then be slid over the top of an existing installed pole structure, such as utility pole or slid onto a pole structure before it is installed. Alternatively, the metal channel 50 may be fixed in position to seal the opening after the sheet of composite material has been installed around a pole structure, such as utility pole. The metal channel 50 may comprise aluminium or any other metal.

Figure 15:
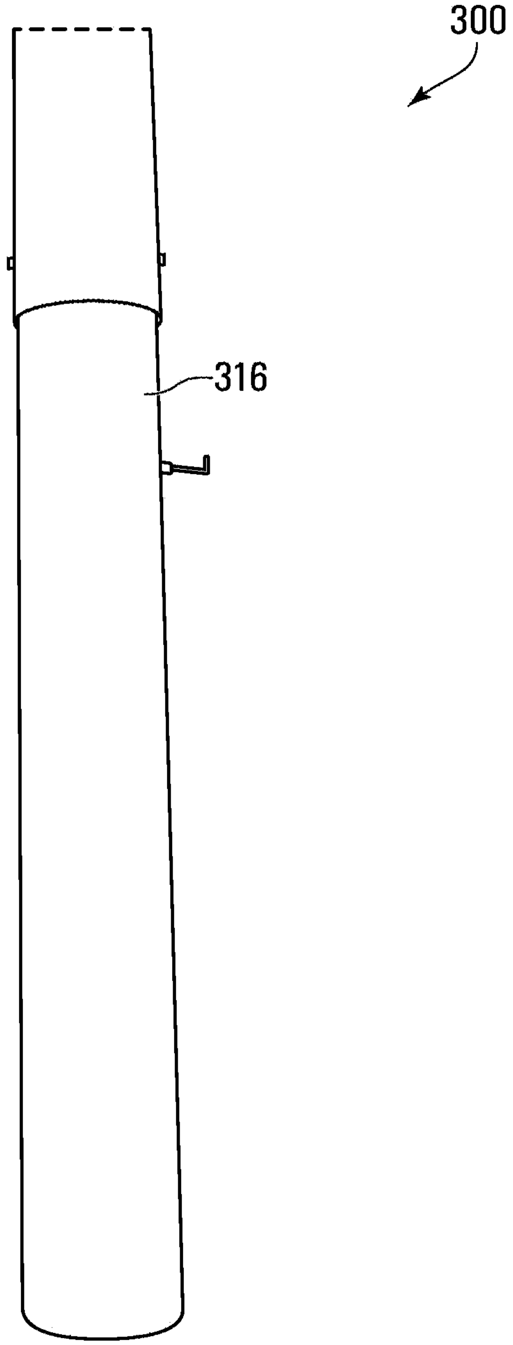
FIG. 15 is a photograph of an embodiment of a unitary pole shield.

FIG. 15 shows a pole shield 300 made of a unitary sheet of composite material 316 with no longitudinal slit or opening. The pole shield 300 may be slid over the top of an existing installed pole structure, such as utility pole or slid onto a pole structure before it is installed. If there is an existing first (old) pole shield in position on an installed pole structure that becomes damaged, worn or burnt, for example as a result of fire exposure, then a second (new) pole shield can be slid onto the pole structure to surround the first pole shield. This may beneficially reduce labour and disposal costs that would otherwise be incurred to remove and dispose of the first pole shield. The second (new) pole shield may have a larger inner diameter than the first (old) pole shield so that the second pole shield is able to surround the first pole shield.

In alternative embodiments, the pole shield may comprise two or more sheets of composite material that are joined together to form a hollow, tubular or other shaped pole shield, that may or may not be tapered. The two or more sheets of composite material that make up the pole shield can be positioned in place around an existing installed pole structure, such as a utility pole and joined together to form the pole shield surrounding the pole structure.

Figure 16A:
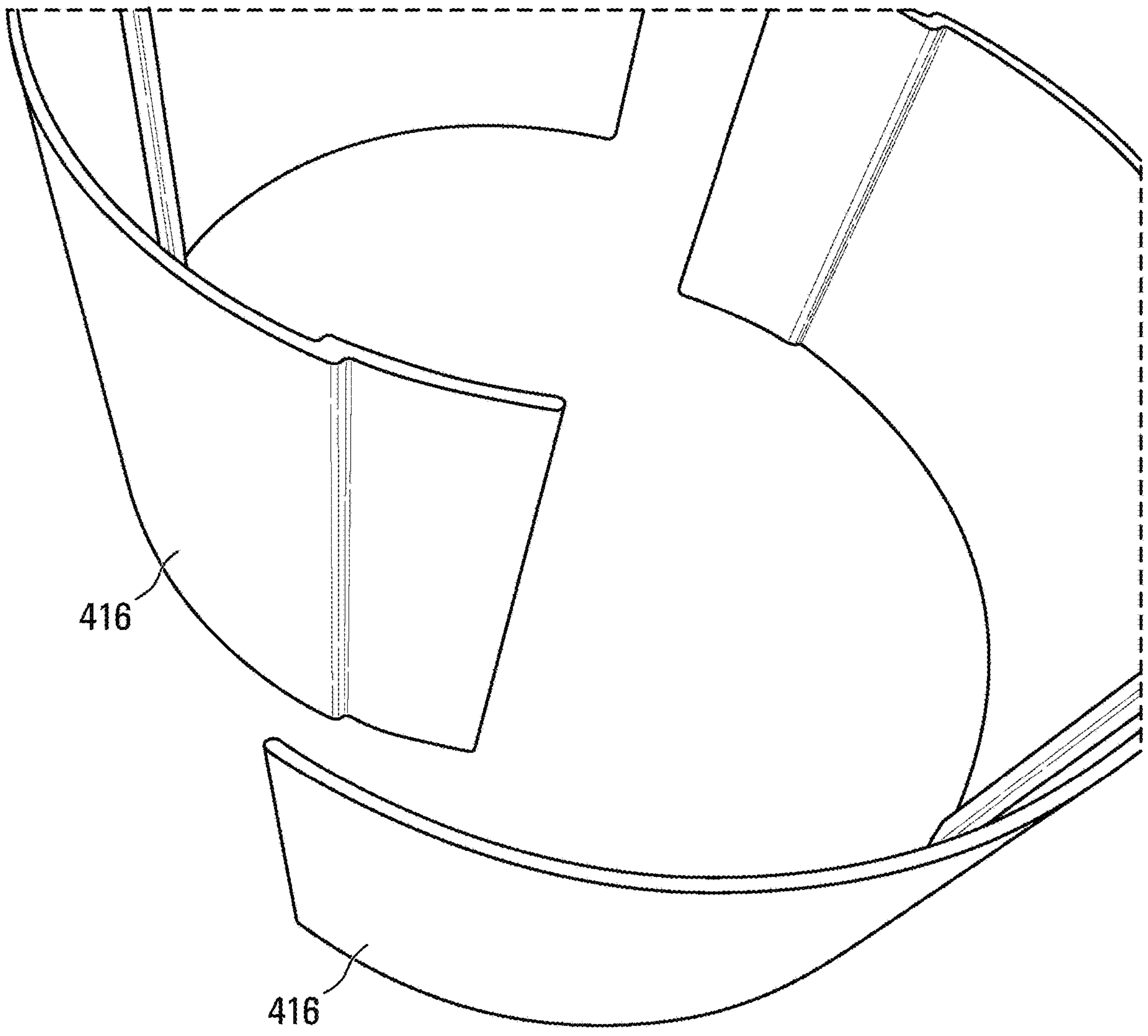
FIGS. 16A and 16B are photographs of an embodiment of a pole shield comprising two sheets of composite material which are joined together to form the pole shield.
Figure 16B:
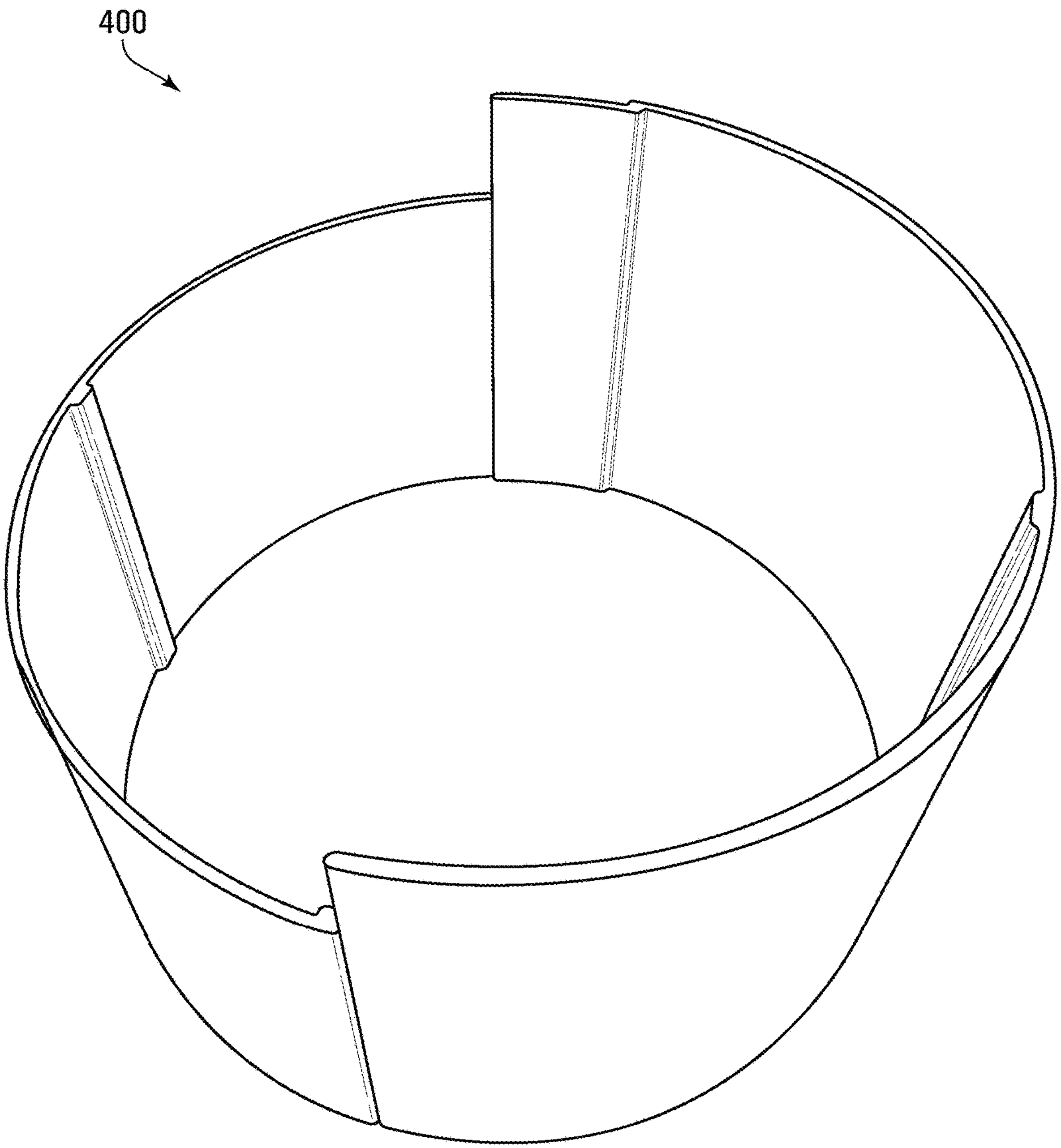

FIGS. 16A and 16B shows an embodiment of a pole shield 400 comprising two sheets of composite material 416 that are joined together to form hollow, tubular pole shield 400 as shown in FIG. 16B. At the join, the two sheets of composite material 416 overlap and can be secured together by screws, nail or other types of fasteners to form the pole shield 400.

The sheet or sheets of composite material comprise reinforcement impregnated with a polyurethane resin. The polyurethane resin holds the reinforcement to form the desired shape while the reinforcement generally improves the overall mechanical properties of the polyurethane resin. The composite material comprises about 20-50% by weight of the polyurethane resin, or any amount therebetween, for example, 22, 24, 26, 28, 30, 32, 34, 36, 38, 40, 42, 44, 46, 48%, or any amount therebetween, by weight of the polyurethane resin, and comprises about 50-80% by weight of the reinforcement, or any amount therebetween, for example, 52, 54, 56, 58, 60, 62, 64, 66, 68, 70, 72, 74, 76, 78%, or any amount therebetween, by weight of the reinforcement.

By the term "reinforcement," it is meant a material that acts to further strengthen the polyurethane resin of the composite material, such as, for example, but not limited to, fibers, particles, flakes, fillers, or mixtures thereof. The reinforcement generally improves the overall mechanical properties of the polyurethane resin. Reinforcement typically comprises glass, carbon, or aramid; however, there are a variety of other reinforcement materials that can be used, as would be known to one of skill in the art. These include, but are not limited to, synthetic and natural fibers or fibrous materials, for example, but not limited to polyester, polyethylene, quartz, boron, basalt, ceramics and natural reinforcement, such as fibrous plant materials, for example, jute and sisal.

The polyurethane resin composition comprises a polyol component and a polyisocyanate component. The polyurethane resin composition may be a thermosetting resin composition which is a liquid reaction mixture used to impregnate the reinforcement and is then set or cured to provide a substantially solid matrix for the reinforcement. Other additives may also be included in the polyurethane resin composition, such as fillers, pigments, plasticizers, curing catalysts, UV stabilizers, antioxidants, microbiocides, algicides, dehydrators, thixotropic agents, wetting agents, flow modifiers, matting agents, deaerators, extenders, molecular sieves for moisture control and desired colour, UV absorber, light stabilizer, moisture absorbents, fire retardants and release agents.

By the term "polyol component" it is meant a composition that contains a plurality of active hydrogen or OH groups that are reactive towards the polyisocyanate component under the conditions of processing. The polyol component of the polyurethane resin composition may comprise polyether polyols and polyester polyols. Polyols described in U.S. Pat. No. 6,420,493 (which is incorporated herein by reference) may also be used in the polyurethane resin composition described herein. The polyol component may include, but is not limited to, a polyether polyol, a polyester polyol, or a mixture thereof. The polyester polyol may be, but is not limited to a diethylene glycol-phthalic anhydride based polyester polyol. The polyether polyols may be, but is not limited to, polyoxyalkylene polyol, propoxylated glycerol, branched polyol with ester and ether groups, amine initiated-hydroxyl terminated polyoxyalkylene polyol and mixtures thereof.

By the term "polyisocyanate component" it is meant a composition that contains a plurality of isocyanate or NCO groups that are reactive towards the polyol component under the conditions of processing. The polyisocyanate component of the polyurethane resin composition may comprise aromatic isocyanate, aliphatic isocyanate or the mixture of aromatic isocyanate and aliphatic isocyanate. Polyisocyanates described in U.S. Pat. No. 6,420,493 may also be used in the polyurethane resin composition described herein.

By the term "aliphatic isocyanate" it is meant an isocyanate in which NCO groups are either attached to an aliphatic center or not attached directly to an aromatic ring. It is also within the scope of the present disclosure that the term "aliphatic isocyanate" means an isocyanate in which the NCO groups are attached to an aliphatic center. Aliphatic isocyanates described in U.S. Pat. No. 6,420,493 may be used in the resin compositions described herein. Aliphatic isocyanates may include, but are not limited to, hexamethylene diisocyanate (HDI), isophorone diisocyanate (IPDI), dicyclohexane-4,4' diisocyanate (Desmodur W), hexamethylene diisocyanate trimer (HDI Trimer), isophorone diisocyanate trimer (IPDI Trimer), hexamethylene diisocyanate biuret (HDI Biuret), cyclohexane diisocyanate, meta-tetramethylxylene diisocyanate (TMXDI), and mixtures thereof. The aliphatic isocyanate may include a polymeric aliphatic diisocyanate, for example, but not limited to a uretidione, biuret, or allophanate polymeric aliphatic diisocyanate, or a polymeric aliphatic diisocyanate in the symmetrical or asymmetrical trimer form, or a mixture thereof, which typically does not present a toxic hazard on account of extremely low volatility due to very low monomer content. The aliphatic isocyanates may be hexamethylene diisocyanate (HDI), isophorone diisocyanate (IPDI) or a mixture thereof, and may be a mixture of aliphatic hexane 1,6-diisocyanato-homopolymer and hexamethylene diisocyanate (HDI). Hexamethylene diisocyanate polyisocyanates described in EP-A 668 330 to Bayer AG; EP-A 1 002 818 to Bayer AG; and WO 98/48947 to Valspar Corp (which are incorporated herein by reference) may be used in the aliphatic isocyanate resin composition described herein.

By the term "aromatic isocyanate" it is meant an isocyanate in which NCO groups are attached to an aromatic ring. Aromatic isocyanates described in U.S. Pat. No. 6,420,493 may be used in the resin composition described herein. Aromatic isocyanates may include, but are not limited to, methylene di-p-phenylene isocyanate, polymethylene polyphenyl isocyanate, methylene isocyanatobenzene or a mixture thereof. The aromatic polyisocyanate may include from about 30% to about 60% by weight, or any amount therebetween, of methylene di-p-phenylene isocyanate, from about 30% to about 50% by weight, or any amount therebetween of polymethylene polyphenyl isocyanate, with a balance of methylene isocyanatobenzene.

The polyurethane resin composition may have a OH:NCO mixing ratio, by volume, from about 1.0:5.0 to about 5.0:1.0, or any amount therebetween, for example a mixing ratio of 1.0:4.0, 1.0:3.0, 1.0:2.0, 1.0:1.0, 2.0:1.0; 3.0:1.0, 4.0:1.0 or any ratio therebetween.

The present disclosure also contemplates the addition of an aliphatic polyurethane composite material top coat or other suitable material to enhance durability and service life of the pole shield. Such materials may be useful for providing a tougher outer surface that is extremely resistant to weathering, ultraviolet (UV) light, abrasion and can be coloured for aesthetics or identification. An aliphatic isocyanate thermosetting polyurethane resin may be used in a top coat or outer layer(s) of the sheet of composite material. The aliphatic isocyanate thermosetting polyurethane resin top layer may have a higher concentration of aliphatic isocyanate than the thermosetting polyurethane resin used for the remainder of the pole shield. Aliphatic isocyanates polyurethane resin has superior resistance to weathering and UV rays, however aliphatic isocyanate resin is generally more expensive than other resins, such as aromatic polyisocyanate polyurethane resin. A pole shield having one or more outer layers of an aliphatic isocyanate polyurethane composite material and an inner core made from a different composite material with a lower concentration of aliphatic isocyanate therein beneficially possesses UV stability and superior abrasion resistance, while being less expensive to produce than a pole shield manufactured with a homogenous distribution of aliphatic isocyanate polyurethane throughout the pole shield.

The sheet or sheets of composite material may be manufactured using filament winding, which is a well-known process for the production of composites. However, other methods may also be used to produce the sheet of composite material, such as, but not limited to, pultrusion, resin injection molding, resin transfer molding and hand lay-up forming applications. A typical filament winding process is described in CA 2,444,324 and CA 2,274,328 (both of which are incorporated herein by reference). Fibrous reinforcement, as described herein, for example, but not limited to glass, carbon, or aramid, is impregnated with the polyurethane resin described herein, and wound onto an elongated mandrel, which may be cylindrical or tapered to produce sheet of composite material respectively. Different shaped mandrels may also be used to produce pole shields having different shapes, such as rectangular, triangular and the like.

The resin impregnated reinforcement may be wound onto the mandrel in a predetermined sequence. This sequence may involve winding layers of the composite material at a series of angles ranging between 0° and 90°, or any amount therebetween, relative to the mandrel axis, for example, at an angle of 5°, 10°, 15°, 20°, 25°, 30°, 35°, 40°, 45°, 50°, 55°, 60°, 65°, 70°, 75°, 80°, 85°, or any amount therebetween. The direction that the reinforcement is laid onto the mandrel may affect the eventual strength and stiffness of the finished pole shield. Other factors that may affect the structural properties of the manufactured pole shield include varying the amount of reinforcement to resin ratio, the wrapping sequence, the wall thickness, the type of reinforcement (such as glass, carbon, aramid), and the ratio of the polyol component to the polyisocyanate component (the OH:NCO ratio) of the polyurethane resin composition. The structural properties of the pole shield can be engineered to meet specific performance criteria. In this way, the construction of the sheet of composite material can be configured to produce a finished pole shield that is extremely strong and of a suitable flexibility for installation around a pole structure.

Once the resin has set or cured, the sheet of composite material may be removed from the mandrel and may be slit longitudinally along its length to provide a pole shield with a slit or opening as shown in FIG. 3. Alternatively, the longitudinal cutting may be performed while the cured sheet of composite material is still on the mandrel. Alternatively, the sheet of composite material is not slit and a unitary pole shield is provided as shown in FIG. 15.

The sheet or sheets of composite material may be made of a single layer of composite material, such as a layer of composite material laid down by filament winding or extruded by pultrusion. Alternatively, the sheet of composite material may include a plurality of layers of the composite material which are laid down by filament winding or by an alternative process such as pultrusion and bonded or joined together or laid down one on top of the other to form the sheet of composite material. The sheet of composite material therefore, comprises one or more than one layer of the composite material, such as, but not limited to, between two to twelve layers of the composite material, for example, 3, 4, 5, 6, 7, 8, 9, 10 or 11 layers. A pole shield made from a plurality of layers of the composite material may beneficially better protect and support the pole structure which it surrounds than a pole shield made from a single layer.

The thickness of the sheet of composite material may vary depending on where, and for what purposes, the pole shield will be used. For example, the sheet of composite material 16, 116 may be about 0.2 mm to about 20.0 mm thick, or any amount therebetween, for example, 0.4, 0.6, 0.8, 1.0, 1.2, 1.4, 1.6, 1.8, 2, 3, 4, 5, 6, 7, 8, 9, 10, 11, 12, 13, 14, 15, 16, 17, 18, 19 mm, or any thickness therebetween.

The sheet or sheets of composite material of the pole shield beneficially provides a lightweight structure that generally displays superior strength and durability compared to the strength and durability associated with the wood, steel or composite pole structures around which the pole shield is intended to be installed. The sheet of composite material may also be designed to be of sufficient flexibility to conform to the shape of the pole structure that it is installed around. The composite material does not rust like steel and typically does not rot or suffer microbiological or insect attack as is common in wood pole structures. The composite material generally acts as a moisture-shield and protects the underlying pole structure from the effects of moisture damage. Furthermore, the composite material, in contrast to natural products (such as wood), is engineered so the consistency and service life can be closely determined and predicted. The composite material (or at least the outer layer(s) of the sheet) may be chosen for its UV resistant properties. Still further, the composite material (or at least the outer layer(s) of the sheet) may be chosen for its fire resistant properties.

By “fire resistant properties” it is meant that the composite material has some resistance to fire. For example, the sheet of composite material may be able to withstand fire exposure for at least 50 seconds or more, for example between 50 and 250 seconds or any time in between such as 180 seconds as provided in the example given below. The temperature of the fire exposure that the sheet of composite material is able to withstand may be at least 500° C. or more, for example between 500 and 1200° C. or any temperature in between, for example between about 1000° C. and 1200° C. The energy of the fire exposure that the sheet of composite material is able to withstand may be at least 3000 $kWs/m^2$, for example between 3000 and 20000 $kWs/m^2$ or any amount in between. The composite material of the pole shield of the present disclosure generally self-extinguishes once the flame source is removed. It is thought that this self-extinguishing property provides fire resistant properties to the pole shield.

A pole shield comprising composite material with fire resistant properties may beneficially be used to surround pole structures, such as a wood or composite utility pole, in fire prone areas. A pole structure with a pole shield is more likely to withstand the effects of wild fire compared to a pole structure without the pole shield. Although the pole structure may sustain some damage as a result of wild fire exposure, as evidenced in the examples disclosed below, the pole structure will typically remain standing after the fire exposure.

In the examples given below, unprotected wood poles exposed to simulated wild fire conditions for severe durations of 120 seconds and extreme durations of 180 seconds, were consumed by flames to the point of failure. Wood poles, protected by a pole shield according to the embodiments disclosed herein when tested under severe conditions of 120 second fire exposure, sustained only minor surface charring and did not exhibit any loss of strength. Although wood poles protected by a pole shield tested under extreme conditions of 180 second fire exposure did fail, it is rare for wild fires conditions to go above 90 seconds duration. Composite poles protected by a pole shield according to the embodiments disclosed herein when tested to fire exposure for severe durations of 120 seconds and extreme durations of 180 seconds all survived intact. Subsequent full-scale bend testing of these composite poles resulted in no reduction in ultimate failure strength or stiffness.

In some embodiments, the pole shield circumferentially extends around the outer surface of pole structure such that pole shield is in direct contact with the outer surface of pole structure. In such an embodiment, the pole shield may be secured in positioned on the pole structure to provide contact with the structure, using a suitable fastener as described above. In an alternative embodiments, the pole shield extends circumferentially around the outer surface of pole structure but does not actually contact pole structure. In these embodiments, there is a gap between the outer surface of pole structure and pole shield, which can be filled with materials to provide further impact or fire resistance to pole structure. Materials, such as, without limitation, sand, foam, rocks, gravel, soil or any other suitable material, may be used. Furthermore, such an embodiment of the pole shield may be useful as a casing or structure for holding backfill materials to provide further structural support to pole structure.

Figure 7A:
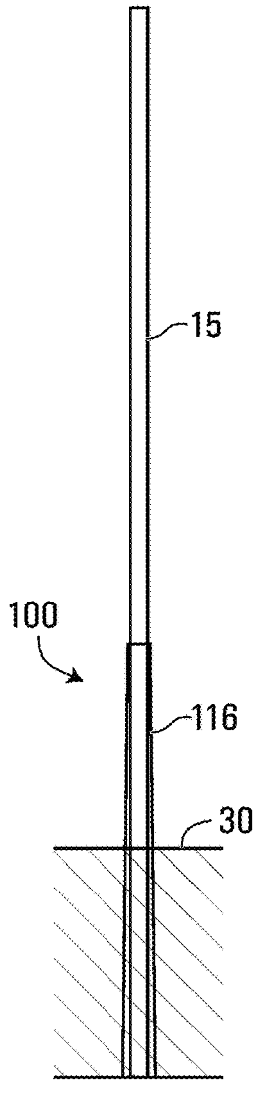
FIGS. 7A, 7B and 7C are side elevation views of the pole shield of FIG. 2 installed around a pole structure, where
Figure 7B:
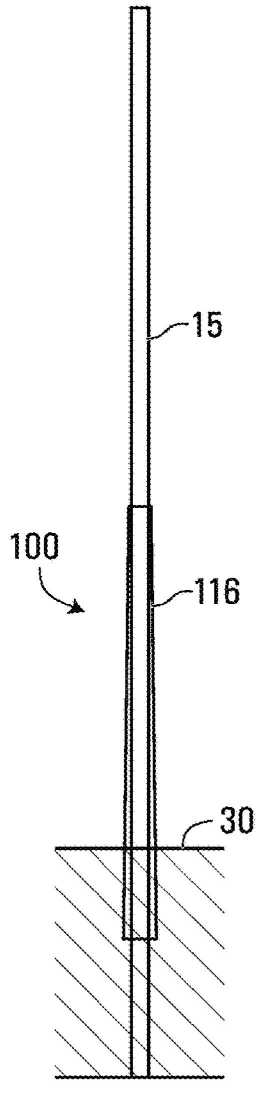
Figure 7C:
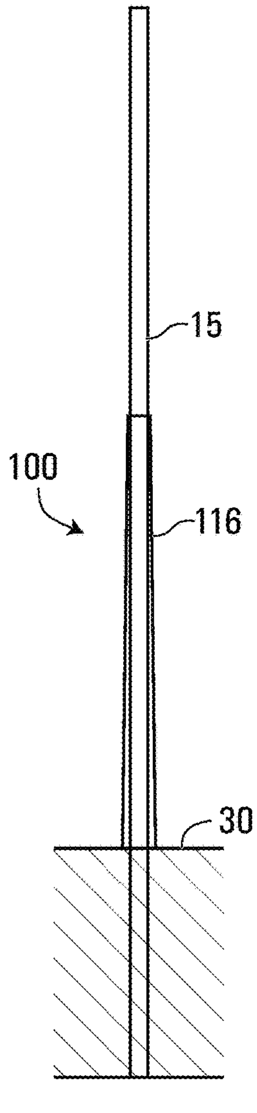

Referring now to FIGS. 7A and 7B, there is shown a portion of the pole shield 100 positioned below the ground surface 30 in order that the pole shield 100 surrounds all or a portion of the underground section of pole structure 15. This may beneficially aid in protection of the underground portion of the pole structure 15 which may be subjected to high moisture and other conditions which can damage the pole structure 15. FIG. 7A shows pole shield 100 extending below ground surface 30 and completely covering the underground section of pole structure 15. The remaining portion of pole shield 100 extends above ground surface 30 and covers the section of pole structure 15 that exits from ground surface 30. FIG. 7B shows pole shield 100 extending below ground surface 30 and only partially covering the underground section of pole structure 15. The remaining portion of pole shield 100 extends above ground surface 30 and covers the section of pole structure 15 that exits from ground surface 30. FIG. 7C shows pole shield 100 above ground only and covering pole structure 15 starting the point that pole structure 15 exits from ground surface 30. Pole shield 100 of FIG. 7C, when installed, rests on the ground surface 30.

Figure 8A:
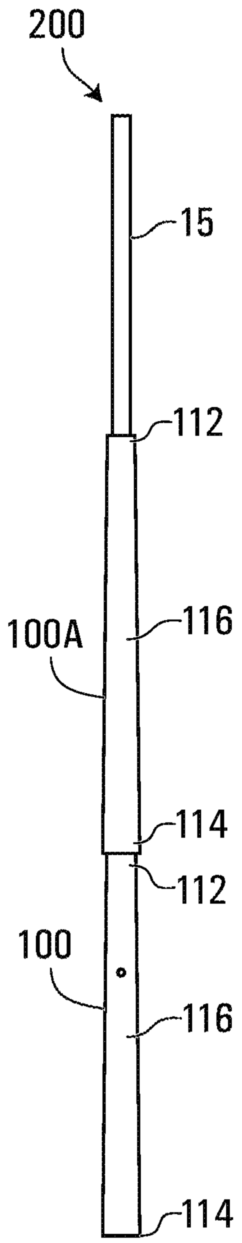
FIGS. 8A and 8B are side elevation views of an embodiment of a pole shield structure, where
Figure 8B:
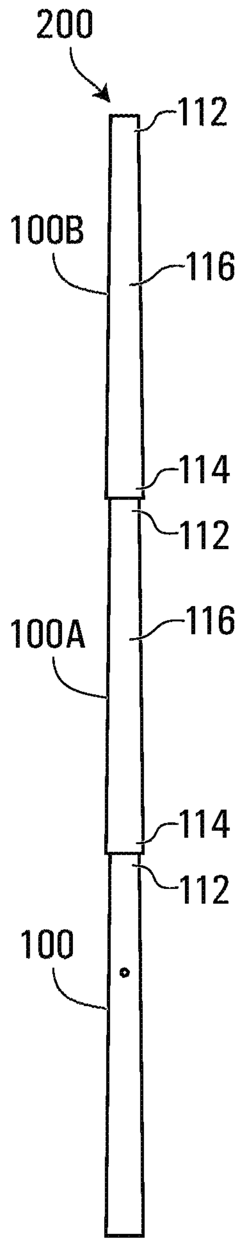

Referring now to FIGS. 8A and 8B, the tapered pole shield 100 is stacked to form a vertical pole shield stack or structure 200 of a selected height to circumferentially extend around the outer surface of pole structure 15. Such an embodiment may be particularly useful if pole structure 15 requires extensive structural support, or for protecting the upper portions of pole structure 15 from damage, such as fire, rain, wind, ice, sand, pests (such as larger animals or birds), or if there is grass, shrubs or other types of vegetation in the surrounding area that extend above the height of a single pole shield installed around pole structure 15.

Each tapered pole shield 100 is hollow and has an open top (or first) end 112 and an open bottom (or second) end 114 with the cross-sectional area of top end 112 being less than the cross-sectional area of bottom end 114. To form pole shield stack 200, bottom end 114 of pole shield 100A is mated with top end 112 of pole shield 100 (as shown in FIG. 8A). Pole shield stack 200 can be of any desired height to extend the pole shield to cover all or most of pole structure 15. The height of pole shield stack 200 can be varied simply by adding or removing pole shield(s) 100 from pole shield stack 200. For example, FIG. 8B shows pole shield stack 200 comprising three pole shields 100, 100A, 100B stacked one on top of the other and extending to the top of pole structure 15 such that the entire pole structure 15 is enveloped by pole shield stack 200. More specifically, bottom end 114 of pole shield 100B is mated with top end 112 of pole shield 100A, and bottom end 114 of pole shield 100A is mated with top end 112 of pole shield 100. The resulting pole shield stack 200 has pole shield 100 positioned adjacent to ground surface 30 or embedded in ground surface 30.

The present disclosure therefore contemplates that pole shield 100 be configured such that two or more than two pole shields may be stacked one on top of the other to form a pole shield structure. In one embodiment of the pole shield structure, the top or first end 112 of lower positioned pole shield 100 slips into, or is matingly received within, the bottom or second end of higher positioned pole shield 100A to a predetermined height to provide elongated vertical pole shield stack 200. In an alternative embodiment of the pole shield structure, the bottom or second end 114 of higher positioned pole shield 100A slips into, or is matingly received within the top or first end 112 of lower positioned pole shield 100. The overlaps of these joint areas may be predetermined so that adequate load transfer can take place from one pole shield and the next. This overlap may vary throughout pole shield stack 200, generally getting longer as the pole shields descend in order to maintain sufficient load transfer when reacting against increasing levels of bending moment. The joints may be designed so they provide sufficient load transfer without the use of additional fasteners, for example press fit connections, bolts, metal banding, screws, nails and the like. However, it is within the scope of the present disclosure that a fastener be used to secure two pole shields together, if desired and there may be no overlap of the poles shields in the stack. The internal dimensions of lower positioned pole shield 100 may greater than the external dimensions of higher positioned pole shield 100A such that a portion or the whole of pole shield 100A nests within pole shield 100 when not assembled for ease of transportation and storage.

In alternative embodiments, the cylindrical pole shield or any other shaped pole shield may be stacked one on top of the other and fastened by overlapping and/or through the use of fastener(s). When pole shields are stacked together to form pole shield stack, they behave as a single structure able to resist forces and to protect pole structure from damage and to provide structure support to pole structure. As described above, the height of pole shield stack can be varied simply by adding or removing pole shield(s) from pole shield stack.

The present disclosure further provides a series or kit including a plurality of pole shields. The pole shields may be of different sizes. The largest pole shield may have a greater internal dimension than the external dimensions of the next largest pole shield, such that at least a portion of the smaller pole shield nests within the larger pole shield. In one embodiment, the whole of the smaller pole shield nests within the larger pole shield. Additional pole shields may be provided that are gradually smaller in size. In this way, the two or more than two pole shields that make up a pole shield stack can be nested one within the other. The nested pole shields offers handling, transportation and storage advantages due to compactness and space saving.

The series or kit may be used to construct pole shield stack 200 whereby the pole shields may be configured so that the top (or first) end 112 of the first or largest pole shield 100 fits inside or is matingly received within the bottom (or second) end 114 of the second or smaller pole shield 100A. Alternatively, the bottom (or second) end 114 of the second or smaller pole shield 100A may be configured so it will fit inside or is matingly received within the top (or first) end 112 of the first or largest pole shield 100. In alternative embodiments, the kit may include cylindrical pole shields 10 or other different shaped pole shields which can be stacked one on top of the other for construction of a pole shield stack or structure.

Figure 9:
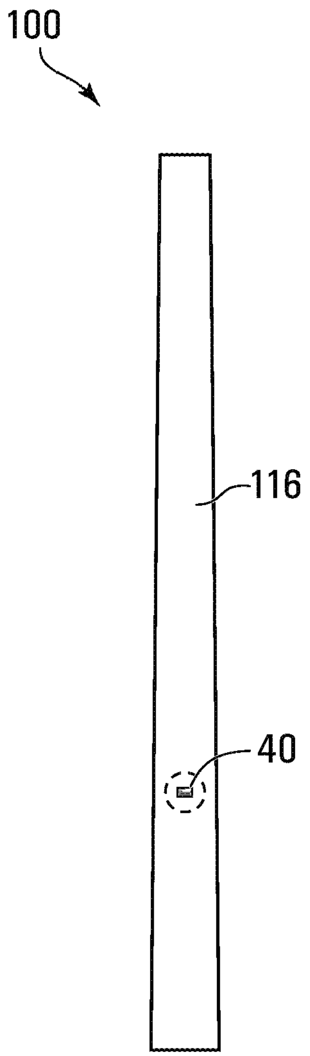
FIG. 9 is a side elevation view of the pole shield of FIG. 2, where the pole shield has an identification (ID) tag.
Figure 10:
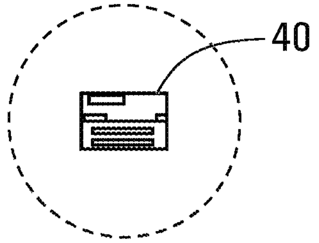
FIG. 10 is a detailed view of the identification (ID) tag of FIG. 9.

Referring now to FIGS. 9 and 10, the pole shield 100 may include an identification (ID) tag 40 on its outer surface that gives information about the pole shield, such as, without limitation, the date of its installation, the date of its last inspection, the date of its next inspection, any parts of the pole shield that require attention or inspection, and any damage to the pole shield. The information may be provided as a bar code which can be easily scanned by a bar code reader so that a large amount of information can be provided by the ID tag 40. Furthermore, as the information can be embedded in a bar code or the like there may be less likelihood that the information on the ID tag will be destroyed by weathering or vandalism. Alternatively, the information may be embossed or printed on the ID tag 40.

In use, therefore (as hereinbefore described), the pole shield of the present disclosure may beneficially protect a pole structure from damage and may also provide additional structural support, especially for leaning or rotting pole structures. The composite material of the pole shield may be selected to include fire suppression qualities. Furthermore, the durability and strength of the composite material may help to support and protect a pole structure from breakage from ice or wind loading. Further, in desert areas, the pole shield may help protect a pole structure from the constant barrage of sand. Still further, the pole shield may help protect a pole structure from moisture, rain, UV damage, bacteria, insects, borers, woodpeckers and other pests, and may thereby reduce the usage of chemicals for treating pole structures. The composite material of the pole shield may also be selected to provide electrical insulation, and therefore can be used as an electrical insulating barrier around steel pole structures. As described above, if the pole shield is positioned away from the outer surface of a pole structure, the gap between the pole structure and the pole shield can be filled in with materials, such as without limitation, sand and foam, to provide impact resistance. Furthermore, with a gap between pole structure and pole shield, the pole shield can be used as a structure or casing for holding backfill materials. The pole shield may also be easier and cheaper to replace if damaged compared to replacing a damaged pole structure, for example, if the pole shield is damaged in a fire, it can be replaced without having to replace the whole pole structure.

EXAMPLES

Fire Exposure and Full-Scale Test Observations

The International Crown Fire Modeling Experiment (ICFME) in the Northwest Territories (NWT) of Canada, was conducted between 1995 and 2001. During this period, 18 high-intensity crown fires were created and studied by over 100 participants representing 30 organizations from 14 countries. The ICFME provided valuable data and insight into the nature and characteristics of crowning forest fires, which greatly assisted in addressing fire management problems and opportunities affecting both people and ecosystems.

Data collected during the ICFME experiments and from literature on wild fire events were used to gauge the severity of the simulated wild fire exposures. Observations from these studies showed gas temperatures ranging from 800-1,200° C. [1,472-2,192° F.], and total heat energy of 6,000-10,000 kW-s/m2. Most fires however are below 1,000° C. [1,32° F.] and exposure durations are rarely above 90 seconds. Wild fires in undisturbed coniferous forests are not expected to exceed 90 seconds in duration. Exposure durations in maintained overhead line right-of-way areas would not typically exceed 60 seconds. The findings from this data is shown in Table 1 below.

TABLE 1

Wild Fire Intensity Characteristics with Corresponding Exposure Time and Gas Temperatures

| Wildfire Intensity | Exposure Duration | Gas Temperature |
|---|---|---|
| Moderate | 30 to ≤90 Seconds | 800-1,200° C. [1,472-2,192° F.] |
| Severe | 91 to 120 Seconds | 800-1,200° C. [1,472-2,192° F.] |
| Extreme | 121 to ≤180 Seconds | 800-1,200° C. [1,472-2,192° F.] |

Example 1

Fire Exposure Test

Pole structures being tested were stood in a vertical position, guyed or embedded to hold the poles in place, instrumented to measure temperature and heat flux and then exposed to propane fueled diffusion flames for durations that simulated severe wild fire conditions. Poles were exposed to beyond worst-case durations of 120 seconds (defined as Severe) and 180 seconds (defined as Extreme).

To ensure flame contact with the pole surface, shrouds were constructed using 20-gauge steel spiral duct of 0.60-0.91 m [24-36 in.] nominal diameter, and with an overall length of 1.5-3.7 m [5-12 ft.]. The shrouds were fitted with openings near the base to accommodate modified propane torches. Fuel was routed via electric solenoid valves to critical flow orifices, which controlled the amount of fuel introduced through the burners. The shrouds were elevated above grade level to control the air available for combustion. The mixing element in each torch was removed to cause pure propane to be expelled from the orifices, making the fuel/air mixture within the test shroud very fuel rich. This ensured that combustion product temperatures achieved a minimum target temperature of 800° C. [1,472° F.]. The combustion products flowed through the annular space between the pole and the shroud and exited the top of the shroud.

Figure 11:
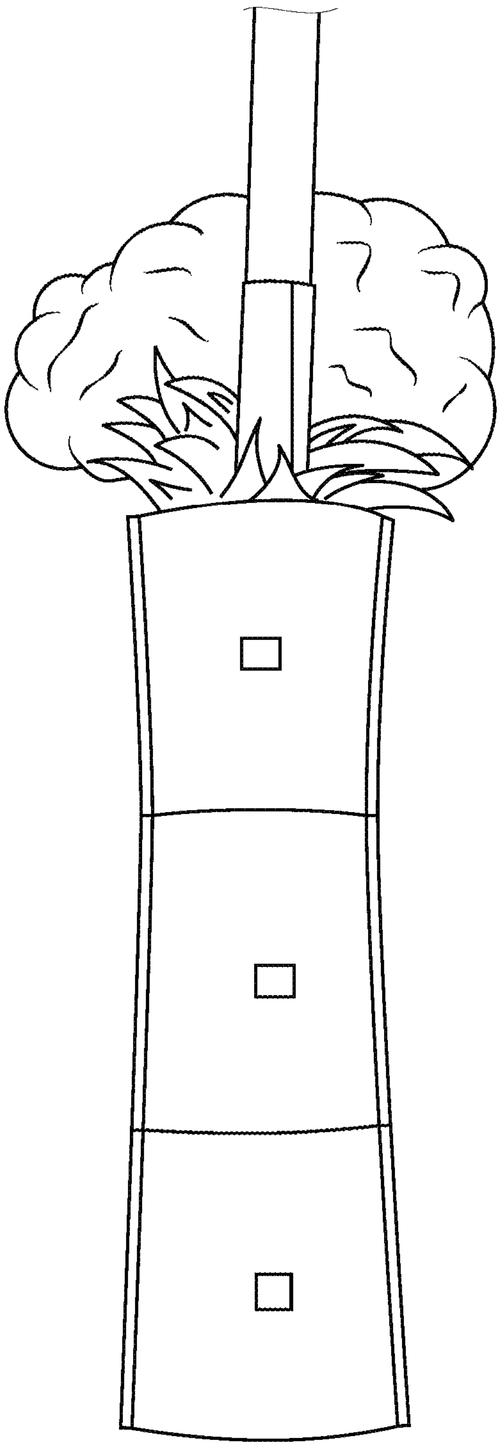
FIG. 11 is a photograph of fire exposure testing of a wood pole with an embodiment of a pole shield surrounding the wood pole.
Figure 12:
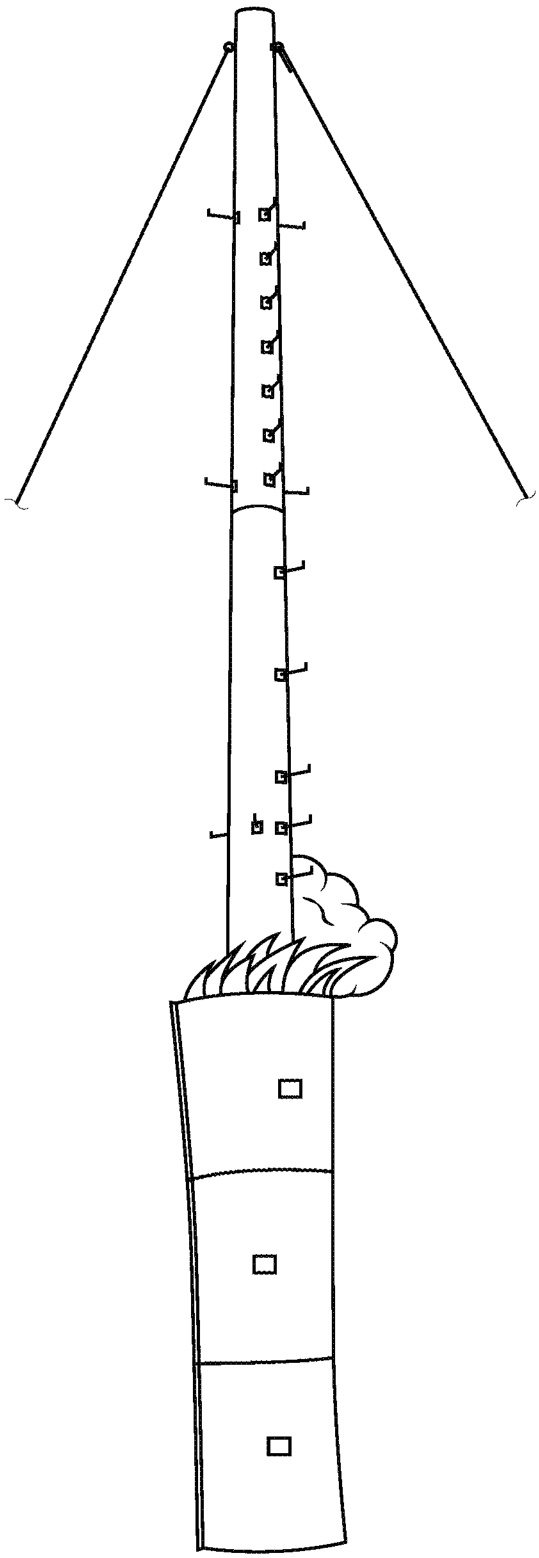
FIG. 12 is a photograph of fire exposure testing of a composite modular pole assembly with an embodiment of a pole shield surrounding the pole assembly.
Figure 13:
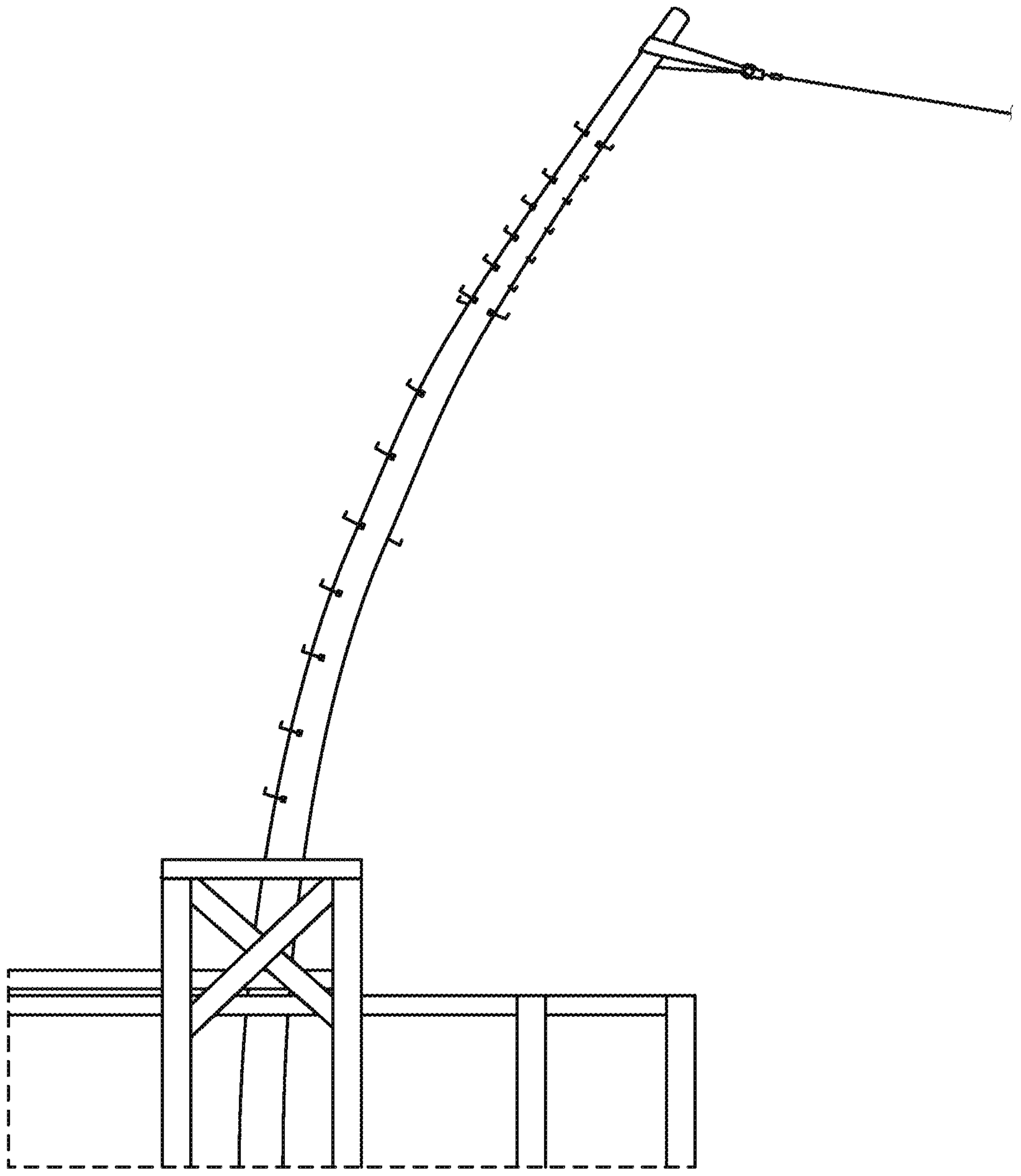
FIG. 13 is a photograph of the composite modular pole assembly with pole shield of FIG. 12 being full scale bend tested to failure after fire exposure.

Various composite poles and wood poles with and without a pole shield were exposed to wild fire conditions. All composite poles and pole shields tested were commercially available from RS Technologies Inc. (hereinafter "RS"). After fire exposure some of the poles were full-scale bend tested (FST) to failure to observe the impact on pole strength and stiffness. FIG. 11 shows a wood pole surrounded by a pole shield being exposed to fire. FIG. 12 shows a composite modular pole assembly with a pole shield being exposed to fire and FIG. 13 shows the composite modular pole assembly with pole shield of FIG. 12 being full-scale bend tested to failure after fire exposure.

Severe Test Protocol—120 Seconds Fire Exposure

Test 1—Wood Pole

A 35 ft. [10.7 m] CL5 red pine pole was fire exposed for 120 seconds, with a maximum gas temperature of 1,040° C. [1,904° F.] and a total energy exposure of 12,200 kWs/$m^2$.

Test 2—Wood Pole with Pole Shield

A 35 ft. [10.7 m] CL5 red pine pole with an RSS-03 RS Fire Shield™ was fire exposed for 120 seconds, with a maximum gas temp of 1,080° C. [1,976° F.] and a total energy exposure of 14,400 kWs/$m^2$.

Test 3—Wood Pole with Pole Shield

A 35 ft. [10.7 m] CL5 red pine pole with a split-fit RSS-03 RS Fire Shield™ was fire exposed for 120 seconds, with a maximum gas temperature of 1,100° C. [2,102° F.] and a total energy exposure of 12,280 kWs/$m^2$.

Test 4—Composite Pole with Pole Shield

A RSM-07-TB-15-83962™ RS composite pole module with a split RSS-09 RS Fire Shield™ was subjected to fire exposure for 120 seconds, with a maximum gas temperature of 1,180° C. [2,156° F.] and a total energy exposure of 9,600 kWs/$m^2$.

Extreme Test Protocol—180 Seconds Fire Exposure

Test 5—Wood Pole

A 35 ft. [10.7 m] CL5 red pine pole was fire exposed for 180 seconds, gas temperatures and heat flux values were not recorded.

Test 6—Wood Pole with Pole Shield

A 35 ft. [10.7 m] CL5 red pine pole with a split-fit RSS-03 RS Fire Shield™ (15 ft. [4.6 m] high) was fire exposed for 180 seconds, with a maximum gas temperature of 1,200° C. [2,192° F.] and a total energy exposure of 17,500 kWs/$m^2$.

Test 7—Composite Pole

A 45 ft. [13.7 m] RS 0204™ modular composite pole without a RS Fire Shield™ was fire exposed for 180 seconds, with a maximum gas temperature of 1,100° C. [2,012° F.] and a total energy exposure of 11,988 kWs/$m^2$.

Test 8—Composite Pole

A 45 ft. [13.7 m] RS 0204™ modular composite pole without a RS Fire Shield™ was fire exposed for 180 seconds, with a maximum gas temperature of 1,109° C. [2,028° F.] and a total energy exposure of 11,808 kWs/m2.

Test 9—Composite Pole with Pole Shield

A 20 ft. [6.1 m] section of a 45 ft. [13.7 m] RS 0204™ modular composite pole covered with a split RSS-05 RS Fire Shield™ and the edge of the Fire Shield™ protected with an aluminum J-Channel was fire exposed for 180 seconds, with a maximum gas temperature of 850° C. [1,562° F.] and a total energy exposure of 16,540 kWs/$m^2$.

Test 10—Composite Pole with Pole Shield

A 45 ft. [13.7 m] RS 0204™ modular composite pole covered with a split RSS-05 RS Fire Shield™ and the edge of the Fire Shield™ protected with an aluminum J-Channel was fire exposed for 180 seconds, with a maximum gas temperature of 1,100° C. [2,012° F.] and a total energy exposure of 15,840 kWs/$m^2$.

Test 11—Composite Pole with Pole Shield

A 45 ft. [13.7 m] RS 0204™ modular composite pole covered with a split RS Fire Shield™ and the edge of the Fire Shield™ protected with an aluminum J-Channel with an intentional 12.7 mm [0.5 in.] uncaulked gap below the slip joint was fire exposed for 180 seconds, with a maximum gas temperature of 1,018° C. [1,864° F.] and a total energy exposure of 13,428 kWs/m$^2$.

Test 12—Composite Pole with Pole Shield

A 45 ft. [13.7 m] RS 0204™ modular composite pole had the base module covered with a slip-fit RS Fire Shield™ and the second module wound with an integrated 3 mm [0.12 in.] Fire Shield™ was fire exposed for 180 seconds, with a maximum gas temp of 1,278° C. [2,332° F.] and a total energy exposure of 12,582 kWs/m$^2$.

Test 13—Composite Pole with Pole Shield

A 45 ft. [13.7 m] RS 0204™ modular composite pole covered with a split RS Fire Shield™ and the edge of the Fire Shield™ protected with an aluminum J-Channel with one unplugged temporary step hole in the fire exposure shroud was fire exposed for 180 seconds, with a maximum gas temperature of 1,018° C. [1,864° F.] and a total energy exposure of 11,867 kWs/m$^2$.

Test 14—Composite Pole with Pole Shield

A 45 ft. [13.7 m] RS 0204™ modular composite pole covered with a split RS Fire Shield™ and aluminum edge fitted with a 318 kg [700 lb] simulated transformer mounted 310 mm [12 in.] away from the pole surface plus a 1.2 m [48 in.] composite cross-arm was fire exposed for 180 seconds, with a maximum gas temperature of 1,059° C. [1,938° F.] and a total energy exposure of 12,060 kWs/m$^2$.

Results

The results of the severe fire exposure tests are given in Table 2 below.

TABLE 2

Fire Exposure Tests

| Test No | Exposure Time (sec) | Max Gas Temp (° F.) | Height Shroud (feet) | Holes Present | Pole to Shield Air Gap | Exposure Dose (kW-s/m$^2$) | FST Breaking Strength | Breaking Strength Spec | Observations |
|---|---|---|---|---|---|---|---|---|---|
| 1 | 120 | 1,904 | 9.5 | N/A | N/A | 12,200 | Not Tested | 1,900 lb | Pole mass 50% consumed after 3.5 hours, flames put out by rain after 5 hours. Pole broke when removing from hole, FST not possible. |
| 2 | 120 | 1,976 | 9.5 | N/A | ¼" | 14,400 | 1,966 lb | 1,900 lb | Pole Shield burnt through isolated spots while in others only outer layer affected, wood pole suffered only surface charring in limited areas, FST completed, no reduction in failure strength observed. |
| 3 | 120 | 2,012 | 12 | N/A | Minimal | 12,280 | 1,674 lb | 1,900 lb | Pole Shield burnt through isolated spots while in others only outer layer affected, wood pole suffered only surface charring in limited areas, FST completed, no reduction in failure strength observed. |
| 4 | 120 | 2,156 | 9.5 | None | Minimal | 9,600 | Not Tested | 5,150 lb | Shield outer resin layer burned off, edge continued to burn in some sections after burners shut off, module below charred under burnt edges, FST not available at the time of fire exposure. |
| 5 | 180 | N/A | 12 | N/A | N/A | Not Recorded | N/A | 1,900 lb | Flame height reached well above the shroud, (over 18') pole smoldered after exposure for 2 hours when it collapsed. Gas and surface temperature, plus |

TABLE 2-continued

| Fire Exposure Tests | | | | | | | | | |
|---|---|---|---|---|---|---|---|---|---|
| Test No | Exposure Time (sec) | Max Gas Temp (° F.) | Height Shroud (feet) | Holes Present | Pole to Shield Air Gap | Exposure Dose (kW-s/$m^2$) | FST Breaking Strength | Breaking Strength Spec | Observations |
| | | | | | | | | | heat flux data was not collected for this test. |
| 6 | 180 | 2,192 | 12 | N/A | Minimal | 17,500 | N/A | 1,900 lb | Flame height reached well above the shield, (over 18') lower shield section destroyed, upper shield intact, pole smoldered at top of lower shield area, plus above upper shield, collapsed overnight. |
| 7 | 180 | 2,012 | 12 | 2 × 1" | N/A | 11,988 | N/A | 5,150 lb | Test was normal until black smoke exited top of pole after burners were turned off. Continued for 6 minutes until pole collapsed. Test duration, open holes and no top cap combined to cause failure. |
| 8 | 180 | 2,028 | 12 | 6 × SS plugs | N/A | 11,808 | N/A | 5,150 lb | Test was normal however pole collapsed 5 minutes after flames were turned off. Gas release sound similar to ASTM tests were heard about 1 minute before collapse. |
| 9 | 180 | 1,562 | 12 | None | Minimal | 16,540 | N/A | | Lower pole shield was largely destroyed, upper shield was less affected, pole surface was discolored in some areas but overall undamaged. Aluminum edge melted but protected shield edge. |
| 10 | 180 | 2,102 | 12 | None | Minimal | 15,840 | 9,289 lb | 5,150 lb | Lower pole shield was largely destroyed, upper shield was less affected, pole surface was discolored in some areas but overall undamaged. FST completed, no reduction in failure strength observed. |
| 11 | 180 | 1,864 | 12 | 6 × SS plugs | Minimal | 13,428 | 6,124 lb | 5,150 lb | Lower pole shield was destroyed, upper shield less affected, uncaulked ½" gap showed no excess damage. FST completed, failure strength above published specification, no change in stiffness. |

TABLE 2-continued

| Fire Exposure Tests | | | | | | | | | |
|---|---|---|---|---|---|---|---|---|---|
| Test No | Exposure Time (sec) | Max Gas Temp (° F.) | Height Shroud (feet) | Holes Present | Pole to Shield Air Gap | Exposure Dose (kW-s/$m^2$) | FST Breaking Strength | Breaking Strength Spec | Observations |
| 12 | 180 | 2,332 | 12 | 5 plugs + 1 step | Minimal | 12,582 | 7,536 lb | 5,150 lb | Lower and upper pole shields burnt but intact. Pole step fire exposed, one SS hole plug fell out during exposure. FST completed, failure strength above published specification, no change in stiffness. |
| 13 | 180 | 1,864 | 12 | 5 × SS plugs | Minimal | 11,867 | 6,746 lb | 5,150 lb | Lower pole shield was destroyed, upper shield less affected, laminate burnt through at open step hole. FST completed, failure strength above published specification, no change in stiffness. |
| 14 | 180 | 1,938 | 12 | 6 × SS plugs | Minimal | 12,060 | 5,321 lb | 5,150 lb | Lower and upper pole shields burnt but intact. No pole deflection/deformation occurred during fire test. FST completed, failure strength above published specification, no change in stiffness. |

All unprotected wood poles exposed to simulated wild fire conditions for severe durations of 120 seconds and extreme durations of 180 seconds, were consumed by flames to the point of failure. Wood poles, protected by an RS Fire Shield™ when tested under severe conditions of 120 second durations, sustained only minor surface charring. Post fire exposure full scale bend testing of wood poles protected with an RS Fire Shield™ did not exhibit any loss of strength. Wood poles protected with an RS Fire Shield™ and exposed to extreme wild fire durations of 180 seconds did not survive.

RS composite poles protected with an RS Fire Shield™ and fire exposed for severe durations of 120 seconds and extreme durations of 180 seconds all survived intact. Subsequent full-scale bend testing of these RS composite poles resulted in no reduction in ultimate failure strength or stiffness.

Example 2

ASTM Fire Exposure Test 7 ft. [2.1 m] RSM-02™ RS composite module pole sections with 4 step holes fitted with silicone rubber plugs were exposed to radiant energy and fire per the ASTM "Standard Test Method for Determining Charring Depth of Wood Utility Poles Exposed to Simulated Wild Fire". Total exposure time was 600 seconds for each test. The first 300 seconds applies 50 kW radiant energy only followed by 300 seconds of 50 kW radiant energy plus fire exposure from a 40 kW ring burner positioned at the pole base. Total energy exposure is in excess of 30,000 kWs/$m^2$. Pole surface and gas temperatures were not measured. The following tests were carried out:

1. RSM-02™ RS composite module pole section without RS Fire Shield™
2. RSM-02™ RS composite module pole section with an integrated 3 mm [0.12 in.] RS Fire Shield™
3. RSM-02™ RS composite module pole section covered with a slip-fit RSS-03 RS Fire Shield™

Results

1. The pole section experienced substantial laminate damaged on the radiant heat side. Just before the end of the test a burst of gas being released was heard.
2. The pole section also experienced laminate damage on the radiant heat side, but to a much lesser extent. No gas discharge was heard.
3. The pole section experienced no laminate damage other than some localized discoloration.

In this disclosure, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

All citations are hereby incorporated by reference.

What is claimed is:

1. A pole shield consisting of one or more than one sheet of composite material forming a hollow structure having an open first end and an opposed open second end for circumferentially fitting around a pole structure, each sheet of composite material comprising from about 50% to about 80% by weight of a reinforcement impregnated with about 20% to about 50% of a polyurethane resin composition comprising a combination of a polyol component and a polyisocyanate component, wherein the polyisocyanate component is chosen from (i) a mixture of aliphatic polyisocyanate and aromatic polyisocyanate with a greater amount of aliphatic polyisocyanate than aromatic polyisocyanate or (ii) aliphatic polyisocyanate and no aromatic polyisocyanate; and wherein the pole shield has fire resistant properties.

2. The pole shield of claim 1, wherein the reinforcement is glass.

3. The pole shield of claim 1, wherein the polyol component comprises a plurality of OH groups that are reactive towards the polyisocyanate component and the polyisocyanate component comprises a plurality of NCO groups that are reactive towards the polyol component.

4. The pole shield of claim 3, wherein the OH:NCO mixing ratio, by volume, of the polyurethane resin composition is from about 1.0:5.0 to about 5.0:1.0.

5. The pole shield of claim 1, wherein the polyol component comprises a polyether polyol, a polyester polyol, or a mixture thereof.

6. The pole shield of claim 1, wherein the polyisocyanate component comprises an aromatic isocyanate, an aliphatic isocyanate, or a mixture thereof.

7. The pole shield of claim 1, wherein the one or more than one sheet of composite material is from about 0.2 mm to about 20.0 mm thick.

8. The pole shield of claim 1, wherein the one or more than one sheet of composite material comprises a plurality of layers.

9. The pole shield of claim 8, wherein the one or more than one sheet of composite material comprises between 2 and 12 layers.

10. The pole shield of claim 1 comprising one sheet of composite material that includes an opening extending from the first end to the second end and the sheet of composite material is movable between a receiving position where the opening is expanded to receive the pole structure and a closed position where the opening is reduced and the sheet of composite material circumferentially extends around the pole structure.

11. The pole shield of claim 10, wherein said one sheet of composite material is biased in the closed position.

12. The pole shield of claim 10, wherein in the closed position a portion of the sheet of composite material overlays another portion of the sheet of composite material.

13. The pole shield of claim 1, wherein the hollow structure is a cylindrical tube and the cross-sectional areas of the open first end and the open second end are substantially the same.

14. The pole shield of claim 1, wherein the hollow structure is a tapered tube and the cross-sectional area of the open first end is less than a cross-sectional area of the open second end.

15. A pole shield structure comprising two or more pole shields of claim 1 stacked one on top of the other with the open first end of a first of the pole shields connecting to the open second end of a second of the pole shields to increase the height of the pole shield extending around the pole structure.

16. The pole shield structure of claim 15, wherein the open first end of the first pole shield overlaps with the open second end of the second pole shield.

17. The pole shield structure of claim 16, wherein the open first end of the first pole shield is received within the open second end of the second pole shield.

18. The pole shield structure of claim 16, wherein the open second end of the second pole shield is received within the open first end of the first pole shield.

19. The pole shield structure of claim 15, wherein the open first end of the first pole shield is connected to the open second end of the second pole shield by a fastener.

20. The pole shield structure of claim 15, wherein the first pole shield has a greater internal dimension than an external dimension of the second pole shield such that at least a portion of the second pole shield nests within the first pole shield when the pole shield structure is unassembled.

21. A kit for constructing a pole shield structure comprising two or more pole shields of claim 1.

22. The kit of claim 21, wherein a first of the pole shields has a greater internal dimension than an external dimension of a second of the pole shields, such that at least a portion of the second pole shield nests within the first pole shield.

23. The pole shield of claim 1, wherein the polyisocyanate component is 100% aliphatic polyisocyanate.

* * * * *